US010365491B1

(12) United States Patent
Kress et al.

(10) Patent No.: US 10,365,491 B1
(45) Date of Patent: *Jul. 30, 2019

(54) HEAD-MOUNTED DISPLAY INCLUDING DIFFRACTIVE COMBINER TO INTEGRATE A DISPLAY AND AN EYE-TRACKING SENSOR

(71) Applicant: Google Inc., Mountain View, CA (US)

(72) Inventors: Bernard C. Kress, Redwood City, CA (US); Hayes S. Raffle, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,106

(22) Filed: May 11, 2017

Related U.S. Application Data

(63) Continuation of application No. 13/872,851, filed on Apr. 29, 2013, now Pat. No. 9,658,453.

(51) Int. Cl.
G02B 5/18 (2006.01)
G06F 3/01 (2006.01)
G02B 27/00 (2006.01)
G02B 27/01 (2006.01)
G02B 27/10 (2006.01)

(52) U.S. Cl.
CPC ....... *G02B 27/0172* (2013.01); *G02B 5/1861* (2013.01); *G02B 27/0093* (2013.01); *G02B 27/1086* (2013.01); *G02B 2027/011* (2013.01); *G06F 3/013* (2013.01)

(58) Field of Classification Search
CPC ............ G02B 27/0172; G02B 27/0093; G02B 27/1086; G02B 5/1861; G02B 2027/011; G06F 3/013
See application file for complete search history.

(56) References Cited

U.S. PATENT DOCUMENTS

| 5,210,626 | A | * | 5/1993 | Kumayama | ........ G02B 27/0103 345/9 |
| 7,401,920 | B1 | * | 7/2008 | Kranz | .................... A61B 3/113 351/209 |
| 9,658,453 | B1 | * | 5/2017 | Kress | ................. G02B 27/0172 |
| 2009/0115968 | A1 | * | 5/2009 | Sugiyama | ............ G02B 27/017 351/221 |
| 2009/0201589 | A1 | * | 8/2009 | Freeman | ............ G02B 27/0103 359/630 |

(Continued)

OTHER PUBLICATIONS

Hua et al. (A compact eyetracked optical see-through head-mounted display, Proc. SPIE 8288, Stereoscopic Displays and Applications XXIII, 82881 F (Feb. 25 2012)).*

*Primary Examiner* — Kimberly N. Kakalec

(57) ABSTRACT

An apparatus comprising a diffractive combiner having a front side, a back side, and a combiner optical axis running substantially through the diffractive combiner and normal to the back side. A display unit having a display optical axis that directs the display light along the display optical axis toward the diffractive combiner. An eye-tracking sensor having a sensor optical axis that is positioned to receive eye-tracking radiation reflected by the diffractive combiner along the sensor optical axis. The combiner optical axis, the display optical axis, and the sensor optical axis intersect each other at the diffractive combiner.

20 Claims, 12 Drawing Sheets

(56) References Cited

U.S. PATENT DOCUMENTS

2010/0103077 A1* 4/2010 Sugiyama ............ G02B 27/017
                                                      345/8
2010/0220291 A1* 9/2010 Horning ............... G02B 27/017
                                                      351/210
2011/0109528 A1* 5/2011 Mun .................. G02B 27/0172
                                                      345/8

* cited by examiner

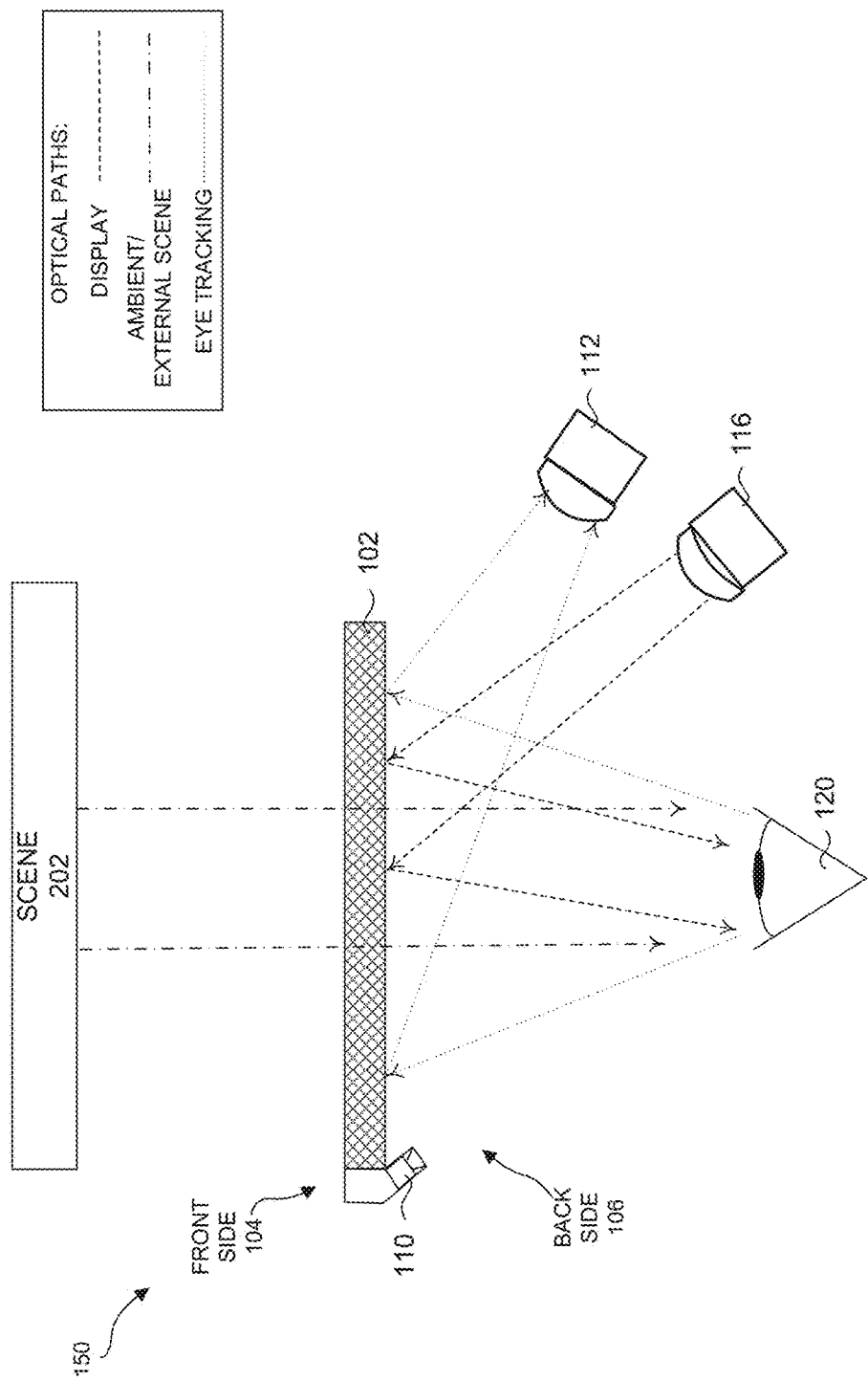

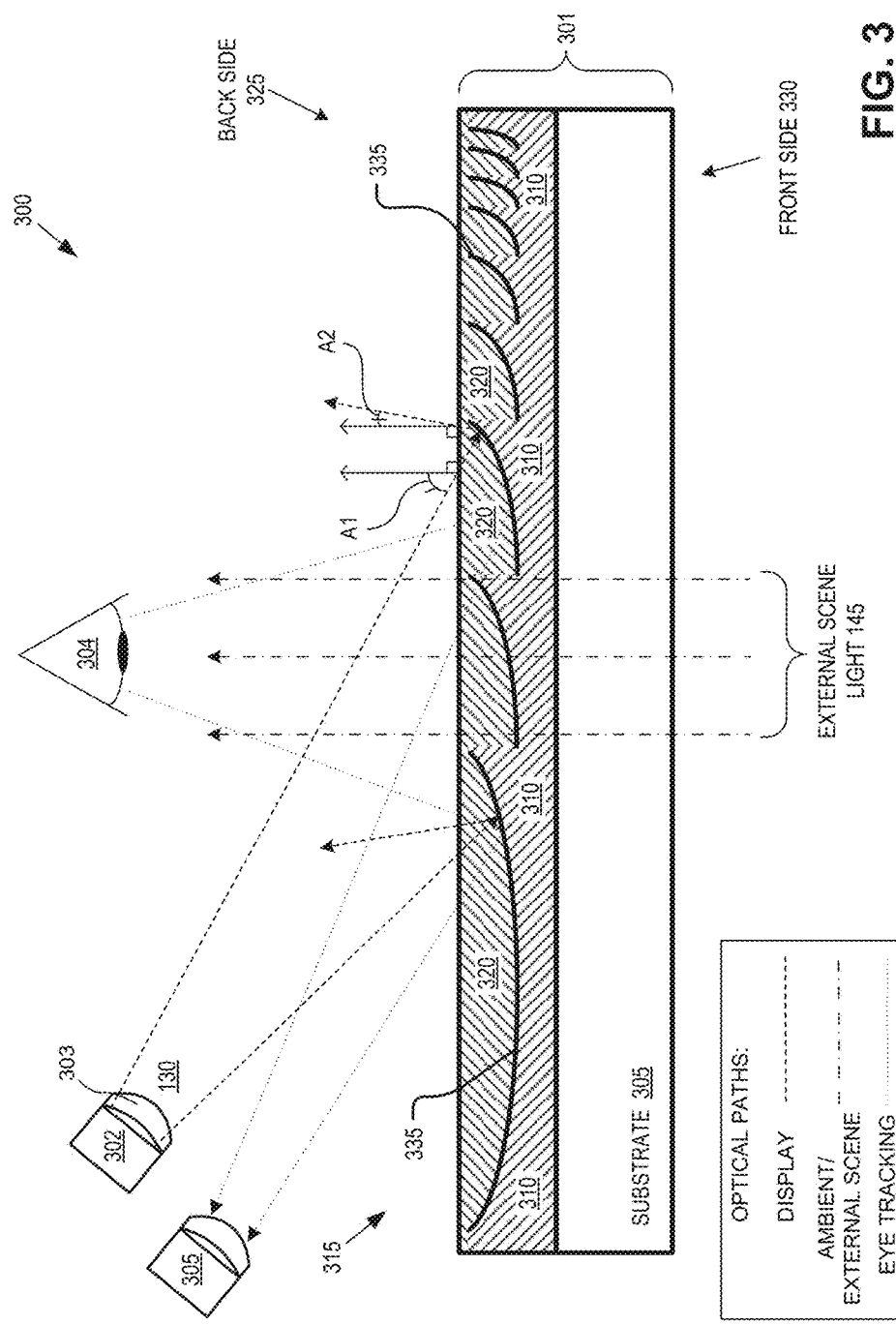

HEAD-MOUNTED DISPLAY INCLUDING DIFFRACTIVE COMBINER TO INTEGRATE A DISPLAY AND AN EYE-TRACKING SENSOR

CROSS-REFERENCE TO RELATED APPLICATIONS

The present patent application is a continuation under 35 U.S.C. § 120 of U.S. application Ser. No. 13/872,851, filed 29 Apr. 2013 and still pending, the contents of which are incorporated herein by reference.

TECHNICAL FIELD

The described embodiments relate generally to head-mounted displays and in particular, but not exclusively, to a head-mounted display including a dual-function diffractive combiner to integrate a display unit and an eye-tracking sensor.

BACKGROUND

Heads-up displays, also known as head-mounted displays or near-to-eye displays, allow a wearer to view a scene while relevant information is overlaid on the scene, so that the wearer looking through the heads-up display simultaneously sees both the scene and the relevant information. For example, a pilot looking through a heads-up display while landing an airplane simultaneously sees the airport ahead (the scene) through the heads-up display while the heads-up display projects information such as speed, heading and altitude (the relevant information) that the pilot needs to land the plane.

In some uses of a heads-up display it can be useful know what part of the scene the wearer is viewing. One way to accomplish this is through eye-tracking technology, but existing eye-tracking technologies can be hard to integrate into heads-up displays. Among other things, existing eye-tracking technologies use an optical path separate from the optical path used for the display, making it difficult to co-aligned the display and the eye-tracking because it requires specialized and bulky optics, in particular additional lens arrangements, making the overall heads-up display more bulky and complex and less streamlined.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2A is a schematic drawing of an embodiment of the operation of the optical assembly shown in FIG. 1B.

FIG. 3 is a cross-sectional view of an embodiment of a sandwiched diffractive optical combiner that can be used the optical assembly embodiments of FIGS. 1A-1B.

DETAILED DESCRIPTION OF THE ILLUSTRATED EMBODIMENTS

Embodiments are described of an apparatus, system and method for a head-mounted display including a diffractive combiner to integrate the display and an eye-tracking sensor. Specific details are described to provide a thorough understanding of the embodiments, but the invention can be practiced without one or more of the described details, or with other methods, components, materials, etc. In some instances, well-known structures, materials, or operations are not shown or described in detail but are nonetheless within the scope of the invention.

Reference throughout this specification to "one embodiment" or "an embodiment" means that a particular feature, structure, or characteristic described in connection with the embodiment is included in at least one described embodiment. Thus, appearances of the phrases "in one embodiment" or "in an embodiment" in this specification do not necessarily all refer to the same embodiment. Furthermore, the particular features, structures, or characteristics can be combined in any suitable manner in one or more embodiments.

Figure 1A:
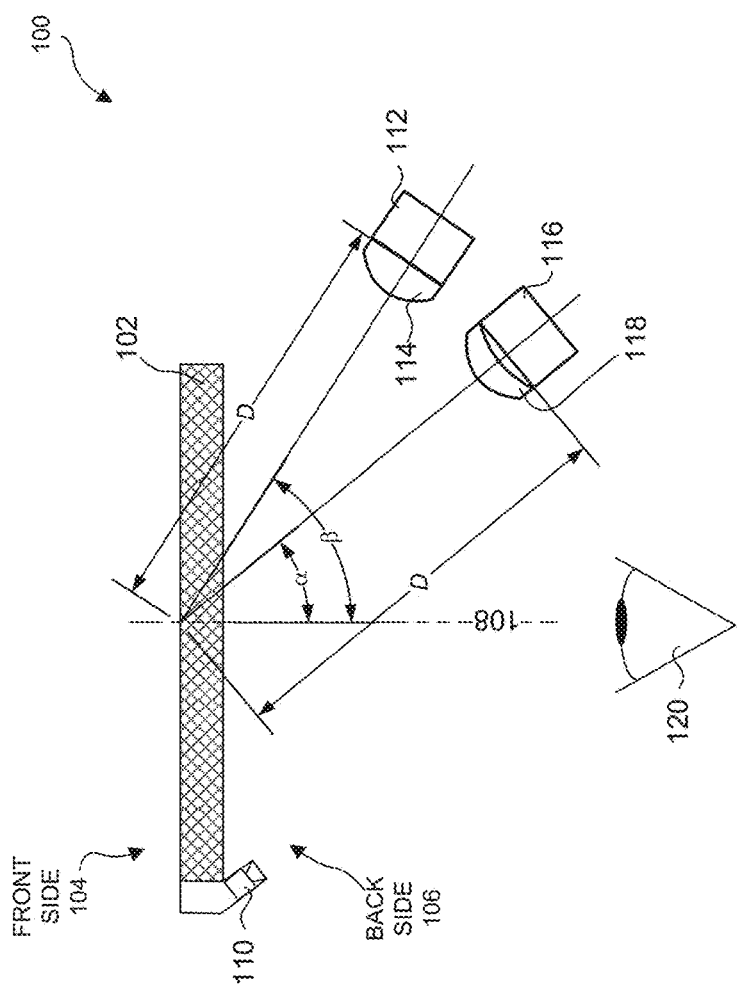
FIG. 1A is a schematic drawing of an embodiment of an optical assembly including a diffractive optical combiner in a see-through near-to-eye configuration.

FIG. 1A illustrates an embodiment of an optical assembly 100. Optical assembly 100 includes a diffractive combiner 102 having a front side 104, a back side 106, and an optical axis 108 that is substantially normal to at least back side 106 and runs approximately through the center of diffractive combiner 102. A diffractive optical combiner is an apparatus that can combine two images together. Both images can originate from the same side of the combiner (in a reflective/reflective combiner or a transmissive/transmissive combiner), or from the two different sides of the combiner (in a reflective/transmissive combiner). In the illustrated embodiment of optical assembly 100, diffractive combiner 102 is configured into a see-through near-to-eye display, meaning it is at least partially transmissive to ambient or external scene light incident on front side 104. Display light is perceived by the user as an image that is superimposed over external scene light (see, e.g., FIG. 2).

In one embodiment of diffractive combiner 102, the diffractive optical combiner can combine two images without lensing (applying optical power) either image; typically this type of optical combiner will be a tilted dichroic plate or compound conjugate lenses. In other embodiments the diffractive combiner can both combine images and the lens the images (i.e., apply optical power to them). The lensing can be used to displace the virtual image originating from the display unit into the far field or at a specific distance from the combiner and to give the image a certain field of view to enable the user to bring the virtual image into focus at the target size. A low cost optical combiner that is compact, lightweight, durable, and provide a good quality image without undue optical aberration. In one embodiment, optical combiner 102 is designed to have high efficiency at the display color (visible) and at the gaze tracking wavelength (near IR), by designing the combiner to be a harmonic or multi-order diffractive lens. For example, a single combiner which diffracts at 550 nm can also diffract at high efficiency at 850 nm, even though 850 is not a harmonic of 550.

In one embodiment, diffractive optical combiner 102 can include a reflective diffraction grating that at least partially reflects display light and brings it to a focus on the retina of wearer's eye 120. In another embodiment, diffractive optical combiner 102 can apply optical power to magnify display light so that the image can be brought into focus by the human eye in a near-to-eye configuration.

An eye-tracking radiation source 110 is positioned to illuminate a user's eye 120 with eye-tracking radiation. In the illustrated embodiment, eye-tracking radiation source 110 points directly toward user's eye 120, so that it directly illuminates the user's eye. In the illustrated embodiment eye-tracking radiation source 110 is adjacent to diffractive combiner 102 and is directly attached to the lateral side of the diffractive combiner, but in other embodiments can be at a different location on the diffractive combiner. In still other embodiments, eye-tracking radiation source 110 can be entirely unattached to the diffractive combiner.

Generally the radiation emitted by eye-tracking radiation source 110 will be outside the visible part of the electromagnetic spectrum. In one embodiment, the eye-tracking radiation emitted by eye-tracking radiation source 110 is infrared, but in other embodiments the eye-tracking radiation can have a wavelength that puts it in some other part of the spectrum besides infrared such as in the ultraviolet part of the spectrum. In some embodiments, eye-tracking radiation source 110 can be a light emitting diode (LED), but in other embodiments it can be another kind of source.

A display unit 116 is optically coupled to diffractive combiner 102. Display unit 116 is positioned at distance D from the diffractive combiner, and its optical axis is positioned at an angle α relative to optical axis 108. Display unit 116 can be implemented using a laser source, a laser diode lamp that illuminates a liquid crystal on silicon (LCoS) display or an liquid crystal display (LCD), a quantum dot array, or otherwise. A broad band lamp source with a narrow band filter can also be used.

Optics 118 can be coupled to display unit 116 to condition light output by the display unit and/or help correct optical defects arising from either the display unit or the diffractive combiner. In some embodiments, reflection of display light by diffractive optical combiner 102 may not be ideal, resulting in various optical aberrations in the reflected display light. These optical aberrations can include distortion, color blur, spherical aberration, coma, and astigmatism. Some of these aberrations are induced by diffractive optical combiner 102 due to its flat, planar design. While diffractive optical combiner 102 could be curved in some designs, such designs will typically be more complex or require additional fabrication steps to make. Color blur can be addressed by using a single color or monochromatic display source, but of the remaining optical aberrations, astigmatism is the dominant aberration that most detracts from image quality. Optics 118 are designed to pre-compensate for at least a portion of the astigmatism that can induced by diffractive combiner 102, but optics 118 can also be designed to compensate for the other optical aberrations mentioned above.

An eye-tracking sensor 112 is also coupled to diffractive combiner 102. In the illustrated embodiment, eye-tracking sensor 112 is a two-dimensional image sensor, but in other embodiments it can be some other kind of sensor. As with display unit 116, eye-tracking sensor 112 can include optics 114 to help condition receive eye-tracking-radiation received from the diffractive combiner and help correct any optical defects in the received radiation.

Eye-tracking sensor 112 is positioned at the same distance D from diffractive combiner 102 as display unit 116, but has its optical axis positioned at an angle β relative to optical axis 108, with angle β being different than angle α at which display unit 116 is positioned relative to optical axis 108. In the illustrated embodiment, β is greater than α, but in other embodiments β can be less than α. Generally, whether α is greater than β or β is greater than α will depend on the wavelength chosen for the eye-tracking radiation and whether the chosen wavelength is above or below the visible spectrum (see, e.g., FIG. 2). In the illustrated embodiment, the eye-tracking radiation is infrared, with the wavelength greater than that of visible light, resulting in eye-tracking sensor 112 being positioned at a larger angle than the display unit because combiner 102 is optically dispersive and will diffract a larger wavelength at a higher angle. This diffraction of different wavelengths at different angles makes it possible to arrange display unit 116 near eye-tracking sensor 112 without overlap.

Figure 1B:
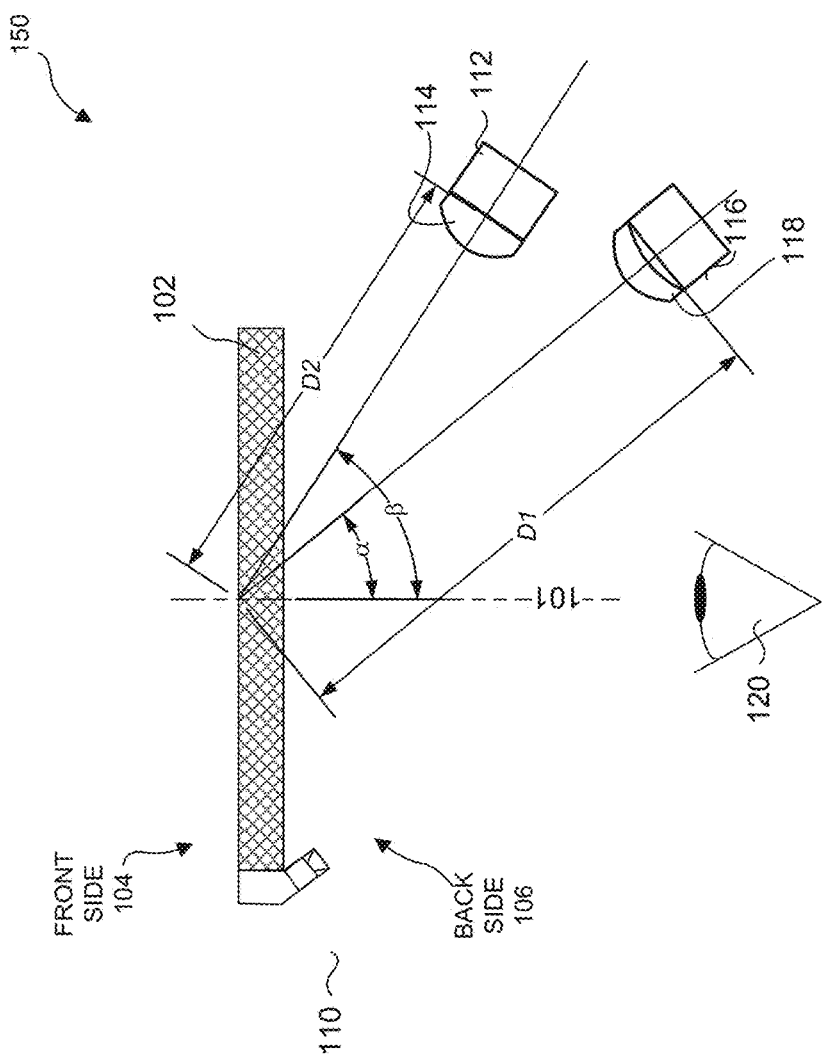
FIG. 1B is a schematic drawing of another embodiment of an optical assembly including a diffractive optical combiner in a see-through near-to-eye configuration.

FIG. 1B illustrates another embodiment of an optical assembly 150. Optical assembly 150 is in most respects similar to optical assembly 100. The primary difference is that in optical assembly 150 the display unit 116 and eye-tracking sensor 112 are positioned differently. Optical assembly 150 has display unit 116 is positioned with its optical axis at an angle α relative to optical axis 108 and eye-tracking sensor 112 is positioned with its optical axis at an angle β relative to optical axis 108, much the same as optical assembly 100. But in optical assembly 150 display unit 116 is positioned at a distance D1 from the diffractive combiner while eye-tracking sensor 112 is positioned at distance D2 from the diffractive combiner, with distance D2 being different than distance D1. As in optical assembly 100, in the illustrated embodiment β is greater than α, but in other embodiments β can be less than α. Similarly, in the illustrated embodiment D1 is greater than D2 but in other embodiments D1 can be less than D2. The relative magnitudes of α and β, and/or D1 and D2, will depend on the wavelengths selected for the display light and the eye-tracking radiation, and whether the selected wavelengths puts the eye-tracking radiation wavelength above or below the display light wavelengths (see FIG. 2 and associated text).

Figure 1C:
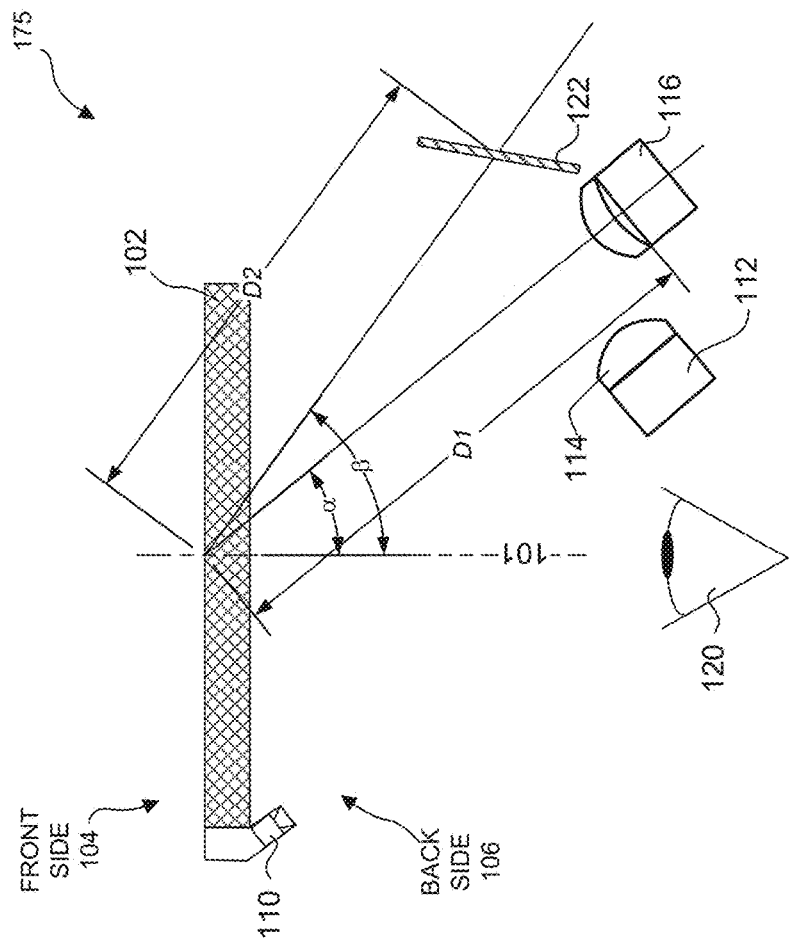
FIG. 1C is a schematic drawing of another embodiment of an optical assembly including a diffractive optical combiner in a see-through near-to-eye configuration.

FIG. 1C illustrates another embodiment of an optical assembly 175. Optical assembly 175 is in most respects similar to optical assemblies 100 and 150. The primary difference is that in optical assembly 175 eye-tracking sensor 112 is optically coupled to a fold element 122 and is positioned differently. The term "fold element" refers to any optical element the changes the direction of (i.e., folds) the optical path. In the illustrated embodiment, fold element 122 is a planar optical element such as a silvered mirror, but in other embodiments other fold elements, such as prisms, can be used. In still other embodiments, fold element 122 can have optical power, allowing it to focus or collimate.

Like optical assemblies 100 and 150, optical assembly 175 has display unit 116 positioned with its optical axis at an angle α relative to optical axis 108. But in optical assembly 175, it is fold element 122 that is positioned with its center at an angle β relative to optical axis 108, so that it will receive eye-tracking radiation reflected by diffractive optical combiner 102 and reflect it toward eye-tracking sensor 112, which is positioned at a location on the opposite side of display unit 116 where it can receive the eye-tracking radiation reflected by fold element 122 (see, e.g., FIG. 2B).

In optical assembly 175 display unit 116 is positioned at a distance D1 from the diffractive combiner while fold element 122 is positioned at distance D2 from the diffractive combiner, with distance D2 being different than distance D1. As in optical assemblies 100 and 150, in the illustrated embodiment β is greater than α, but in other embodiments β can be less than α. Similarly, in the illustrated embodiment D1 is greater than D2 but in other embodiments D1 can be less than or equal to D2. The relative magnitudes of α and β, and/or D1 and D2, will depend on the wavelengths selected for the display light and the eye-tracking radiation, whether the selected wavelengths puts the eye-tracking radiation wavelength above or below the display light wavelengths, and where eye-tracking sensor 112 is positioned relative to display unit 116 and fold element 122 (see FIGS. 2A-2D and associated text). Use of fold element 122 can lead to a more compact architecture; when optical assembly is used in a heads-up display such as the one shown in FIG. 7, the fold element can save substantial space towards the temple region.

FIG. 2A illustrates an embodiment of the operation of optical assembly 150, but optical assembly 100 operates similarly.

Three separate optical paths operate simultaneously in optical assembly 150: the ambient or external scene light path, the display light path, and the eye-tracking radiation path. In the described embodiment, the display light is in the visible portion of the spectrum while the eye-tracking radiation is in the infrared portion of the spectrum, such that the wavelength of the eye-tracking radiation is higher than the wavelength of the display light. In one example, the display light has a center wavelength (i.e., the wavelength at the middle of the wavelength range of the display light) of 550 nm while the eye-tracking radiation has a wavelength of 850 nm, or roughly double the center wavelength of the display light. Combiner 102 can be designed to have high efficiency at the display light color (visible) and at the eye-tracking wavelength (near IR), by designing the combiner to be a harmonic or multi-order diffractive lens so that combiner 102 can diffract at high efficiency at 550 nm can also diffract at high efficiency at 850 nm, even though 850 is not a harmonic of 550.

The first optical path in optical assembly 150 is the ambient or external scene light path. Ambient or external light originates at external scene 202 and travels directly through the optical combiner 102 into eye 120 of the user. In an embodiment where optical combiner 102 has optical power, the ambient or external light can also be focused or otherwise modified as it passes through the optical combiner and before it reaches eye 120.

The second optical path in optical assembly 150 is the display light path. Display light originates at display unit 116, which directs the display light toward the back side 106 of the diffractive combiner 102. Display light enters the back side of the combiner and is reflected and/or focused by the combiner to the retina of user's eye 120.

Third optical path in optical assembly 150 is the eye-tracking radiation path. Eye-tracking radiation originates at eye-tracking radiation source 110, which directly illuminates eye 120; in the illustrated embodiment, part of the optical path between eye-tracking radiation source 110 and eye 120 is not shown to avoid having a confusing number of lines on the drawing. Upon reaching eye 120, the eye-tracking radiation is refracted reflected by the iris of eye 120 toward back side 106 of diffractive combiner 120. The reflected eye-tracking radiation enters the back side of diffractive combiner 102, whereupon it is reflected and/or focused toward eye-tracking sensor 112. Because the eye-tracking wavelength is different than the wavelengths of the display light, the dispersion of optical combiner 102 causes eye-tracking radiation to deflected at different angles and different distances by the diffractive combiner. Hence the different angular and longitudinal placement of the display unit and the eye-tracking sensor.

Figure 2B:
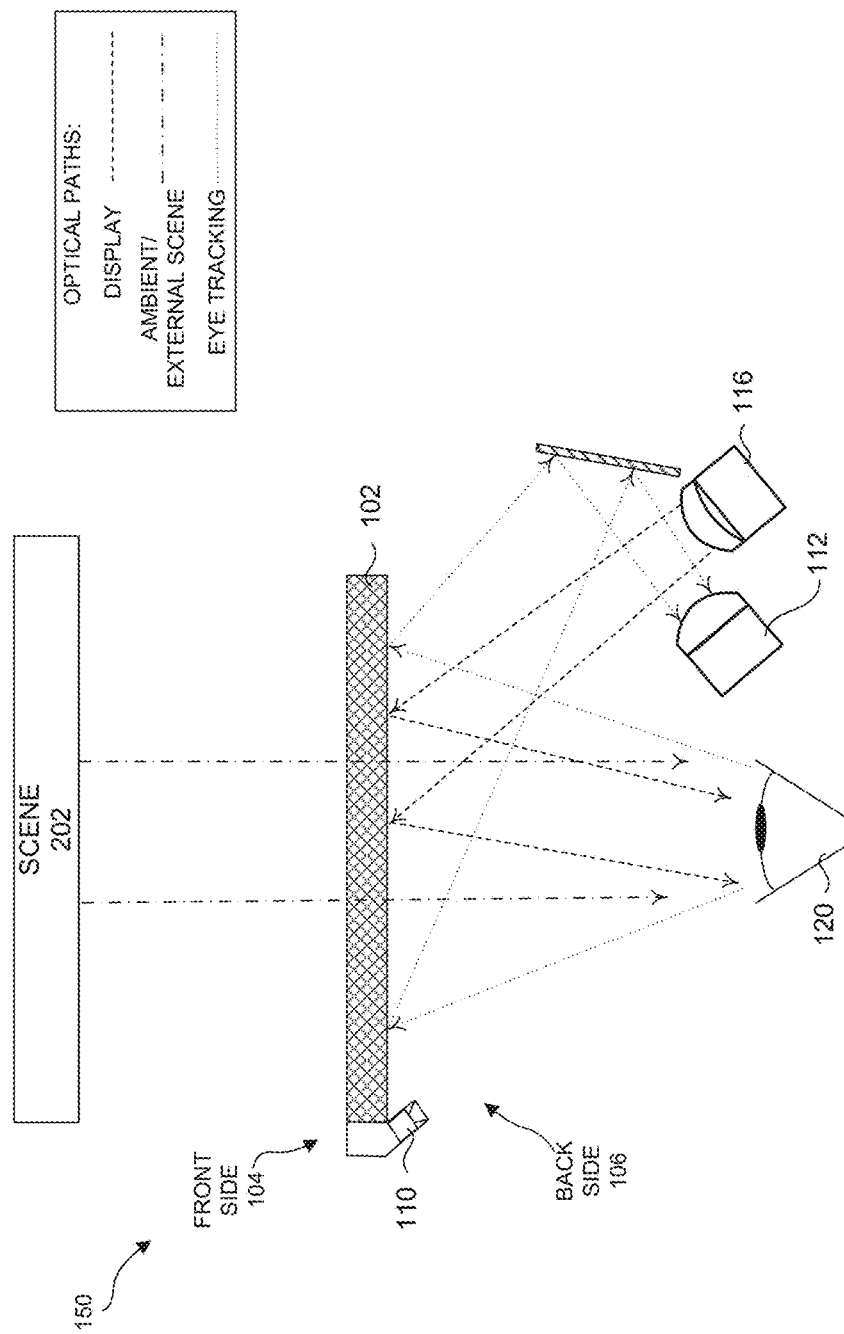
FIG. 2B is a schematic drawing of an embodiment of the operation of the optical assembly shown in FIG. 1C.

FIG. 2B illustrates an embodiment of the operation of optical assembly 175. As with optical assemblies 100 and 150, three separate optical paths operate simultaneously in optical assembly 175: the ambient or external scene light path, the display light path, and the eye-tracking radiation path. In the described embodiment, the display light is in the visible portion of the spectrum while the eye-tracking radiation is in the infrared portion of the spectrum, such that the wavelength of the eye-tracking radiation is higher than the wavelength of the display light. In optical assembly 175, the ambient or external scene light path and the display light path are substantially the same as the corresponding light paths in optical assemblies 100 and 150. But in optical assembly 175 the eye tracking radiation path is different. As with the other optical assemblies, eye-tracking radiation originates at eye-tracking radiation source 110, which directly illuminates eye 120. Upon reaching eye 120, the eye-tracking radiation is reflected by the iris of eye 120 toward back side 106 of diffractive combiner 120. The reflected eye-tracking radiation enters the back side of diffractive combiner 102, whereupon it is reflected and/or focused toward fold element 122. The dispersion of optical combiner 102 causes the eye-tracking radiation to be reflected at different angles and different distances, hence the angular and longitudinal placement of fold element 122 and eye-tracking sensor 112, as shown in FIG. 1C. When the eye-tracking radiation reaches fold element 122, it is in turn reflected toward eye-tracking sensor 112.

Figure 2C:
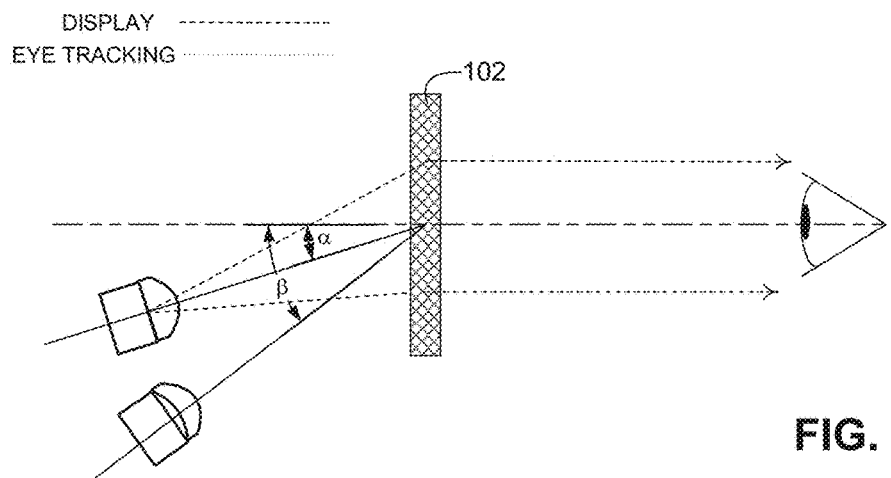
FIGS. 2C-2E are schematic drawings of the principle of operation of a diffractive optical combiner.
Figure 2D:
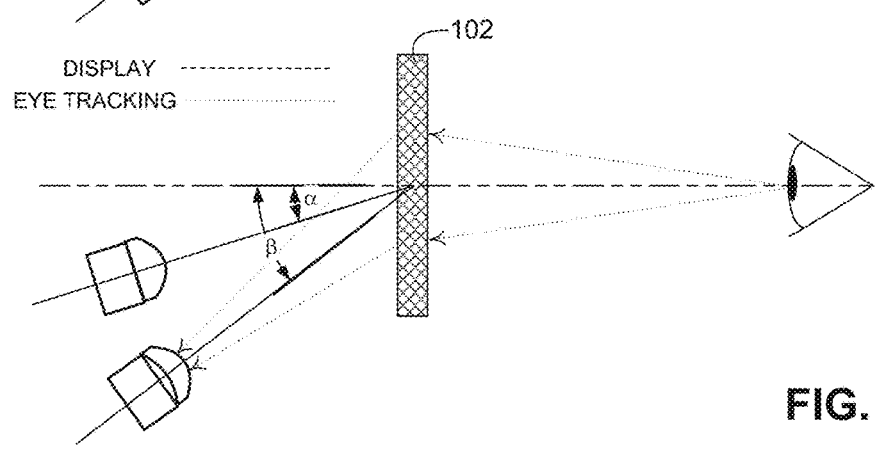
Figure 2E:
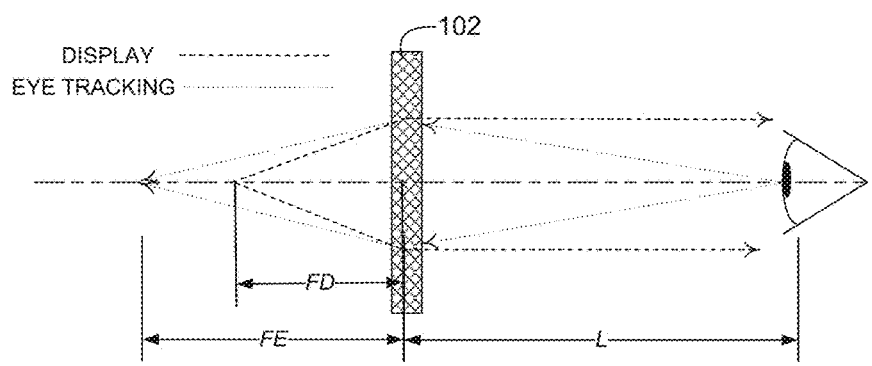

FIGS. 2C-2E illustrate the principle of operation of an embodiment of an optical combiner. For clarity the figures illustrate the transmissive operation of an optical combiner, but the principles are analogous in reflective operations such as shown in FIGS. 2A-2B. Optical assemblies 100, 150 and 175 all take advantage of the fact that diffractive combiner 102 is highly spectrally dispersive; by changing the wavelength, the location of the image created by the diffractive combiner changes much more than in a refractive system. This spectral dispersion of diffractive combiner 102 simplifies the hardware design because it uses the same optics simultaneously for both display and eye-tracking. It also simplifies the software design for eye-tracking, because it greatly simplifies software calibration that is necessary to determine the user's gaze location.

FIGS. 2C-2D illustrate the combiner's lateral dispersion, which optical assemblies 100, 150 and 175 use to get the eye-tracking optical path to be near the display light optical path Lateral dispersion is a result of chromatic aberrations of diffractive combiner 102, which cause longer wavelengths to produce a larger angular offset. This allow eye-tracking sensor 112 and display unit 116 to be positioned side-by-side at different angles α and β, rather than on the same optical axis.

FIG. 2E illustrates longitudinal dispersion, which is used by optical assemblies 150 and 175 in addition to lateral dispersion Longitudinal dispersion is also a result of chromatic aberrations of diffractive combiner 102, Longitudinal chromatic aberration of diffractive combiner 102 produces an image that is closer to combiner 102, which is not good. By focusing on the front of the eye, the image of the iris is pushed back again close to the plane of the eye-tracking sensor 112. Thus, the combiner compensates for the fact that the eye-tracking target at the front of the eye (usually the iris) is closer to the eye-tracking sensor 112 than the virtual image formed by display unit 116 and combiner 102 (usually formed on the retina) is to the display unit because the eye-tracking sensor focuses on the iris but the display unit focuses on the retina. In FIG. 2E, the longitudinal dispersion can be described with the following equations, which use the paraxial approximation:

$$\frac{1}{L} + \frac{1}{FD} = \frac{1}{FE},$$

and $FD \cong \zeta FE$(paraxial approx.), where $$\zeta = 1 + \left(\frac{\lambda_E - \lambda_D}{\lambda_D}\right).$$

In these equations, L is the distance from the eye to the combiner, FD is the distance at which display light is focused, FE is the distance at which eye-tracking radiation is focused, $\lambda_E$ is the wavelength of the eye-tracking radiation, and $\lambda_D$ is the center wavelength of the range of display light wavelengths or, alternatively, the wavelength of a particular color, such as green, in the range of display light wavelengths.

Figure 4:
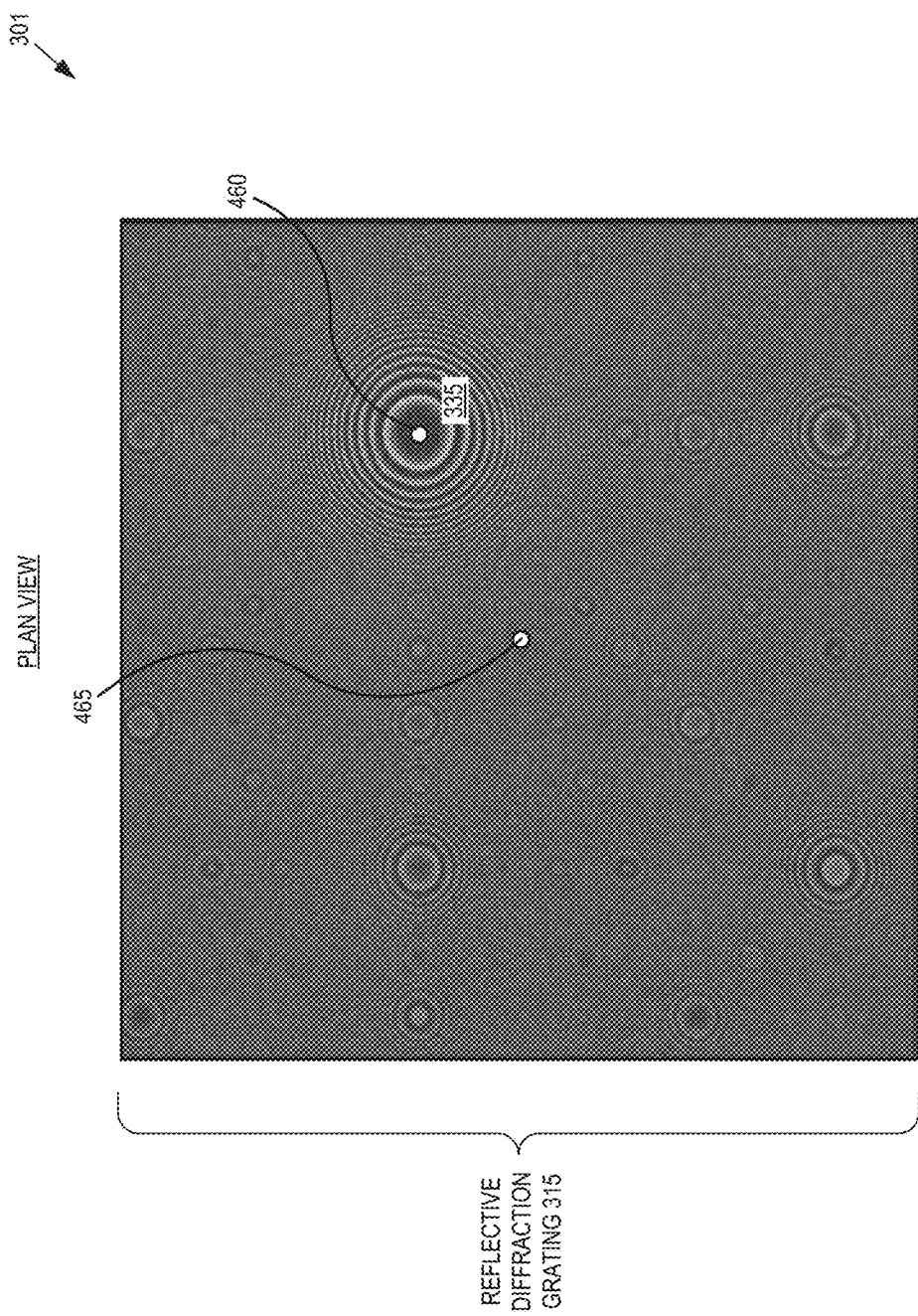
FIG. 4 is a plan view of an embodiment of a sandwiched diffractive optical combiner shown in FIG. 3.

FIGS. 3-4 together illustrate a heads-up display 300 including a sandwiched diffractive optical combiner; FIG. 3 is a cross-sectional view, FIG. 4 a plan view. See-through display 300 is one possible implementation of optical assemblies 100 and/or 150 (see FIGS. 1A-1B) and hence sandwiched diffractive optical combiner 301 is one possible embodiment of diffractive optical combiner 102.

The illustrated embodiment of see-through display 300 includes a sandwiched diffractive optical combiner 301, display unit 302, and eye-tracking sensor 305. The illustrated embodiment of optical combiner 301 includes a substrate 305, a base sandwich layer 310, a reflective diffraction grating 315, a planarization sandwich layer 320, an back side 325, and a front side 330. The illustrated embodiment reflective diffraction grating 315 is formed of a two-dimensional ("2D") array of three-dimensional ("3D") diffraction element shapes formed into base sandwich layer 310 with partially reflective elements 335 coated onto the 3D diffraction element shapes and conforming thereto.

Diffractive optical combiner 301 is referred to as a sandwiched optical combiner because it sandwiches reflective diffraction grating 315 between two material layers (i.e., base sandwich layer 310 and planarization sandwich layer 320) having substantially equal, if not identical, indices of refraction. By doing this, optical combiner 301 simultaneously operates in both reflection and transmission modes with each mode having different characteristics. In reflection, display unit 302 and eye-tracking sensor 305 are positioned on the same side of optical combiner 301 as the user's eye 304 (i.e., back side 325). Since reflective diffraction grating 315 is composed of partially reflective elements 335, a portion of display light 130 output from display unit 302 is reflected back towards user's eye 304. Similarly, in transmission the diffractive effects of reflective diffraction grating 315 can be annihilated by using the same or similar index of refraction material above and below partially reflective elements 335. Since partially reflective elements 335 are also partially transmissive and sandwiched in substantially uniform index material(s), the portion of external scene light 145 that passes through reflective diffraction grating 315 is not diffracted, but rather passes to eye 304 substantially without experiencing optical distortion or power. By simultaneously operating diffractive optical combiner 301 in both reflective and transmissive modes, it can be used to overlay display light 130 onto external scene light 145 to provide a type of augmented reality to the user.

Optics 303 can be positioned in the optical path of display light 130 between display unit 302 and optical combiner 301 to apply compensation to display light 130 before the light is incident upon optical combiner 301, as discussed above. Optics 303 can be held in place in front of the emission aperture of display unit 302 by lens mounts (not illustrated). These lens mounts can be a slot into which aberration compensation optics 303 are inserted or slid, a clip attachment, a hinging clasp or clamp, transparent glue, a friction fit, or otherwise.

In some embodiments, the shape, size, orientation, and placement of the individual 3D diffraction element shapes formed into base sandwich layer 310 can be designed to provide optical power for magnifying display light 130. This magnifying configuration can be particularly useful in near-to-eye configurations, such as head mounted displays ("HMDs") and some types of heads up displays ("HUDs"), such as scopes.

In one embodiment, reflective diffraction grating 315 is an off-axis lens capable of receiving input light at incident angle A1 and reflecting the display light along a reflection path having an emission angle A2 that is different from A1, A1 and A2 both being measured from the normal of the emission surface of optical combiner 301 from which reflected display light 130 is emitted. In FIG. 3, the emission surface coincides with back side 325 of planarization sandwich layer 320. In one embodiment, incident angle A1 (e.g., 42 degrees) is greater or more oblique from normal than emission angle A2 (e.g., zero degrees). This enables display unit 302 and eye-tracking sensor 305 to be positioned laterally relative to optical combiner 301 so as not to block external scene light 145. In HMD configurations, off-axis lensing permits display unit 302 and eye-tracking sensor 305 to be positioned peripherally in the temple region of the user, leaving the user's forward vision unobstructed. The off-axis lensing redirects the emission angle A2 to be less oblique from normal than the incident angle A1, thereby directing the reflected display light into the user's eye at a closer-to-normal angle, versus overshooting the eye and illuminating the nose. Off-axis lensing using diffractive optics also provides a specific angular bandwidth to reflective diffraction grating 315. This helps reduce distractions due to backside reflections and improve contrast of the reflected display light 130 over external scene light 145. Diffraction grating 315 can have a phase that is either rotationally symmetric or non-rotationally symmetric.

In FIG. 4, off-axis lensing can be achieved by chirping the diffraction grating pattern and offsetting the center 460 of the diffraction pattern relative to the user's center of vision 465. In the illustrated embodiment, the pattern center 460 is denoted as the center of the largest partially reflective element 335. As the pattern extends out from center 460, partially reflective elements 335 become gradually smaller. In FIGS. 3 and 4, the 3D diffraction element shapes have parabolic cross-sectional shapes (see FIG. 3) and rotationally symmetric (circular or spherical lens) or non-rotationally symmetric (aspheric lens) perimeter shapes (see FIG. 4). However, other cross-sectional shapes and perimeter shapes (e.g., elliptical, etc.) can be used to create reflective diffraction grating 315. The illustrated embodiment of FIG. 4 is a 16 phase level off-axis diffractive lens, but other numbers of phase levels can be used, the most effective lens having an infinite number of phase levels (quasi analog surface relief diffractive lens). In one embodiment, reflective diffraction grating 315 is defined by the following phase polynomial:

$$\text{Phase}(r) = C1*r^2 + C2*r^2 + C3*r^6,$$

where C1, C2, and C3 are coefficients and r represents radius in mm. In one embodiment, C1=−0.0125, C2=1.370e-006, and C3=−9.396e-011 while the diffraction order is +1 and for a wavelength of 524 nm, but in other embodiments reflective diffraction grating 315 can be implemented with other coefficient values and at other wavelengths.

Reflective diffraction grating 315 is formed by overlaying each 3D diffraction element shape with a partially reflective element 335. Partially reflective elements 335 each conformally coat a corresponding 3D diffraction element shape thereby creating a reflective structure that assumes the shape and orientation of the underlying 3D diffraction element shape.

Partially reflective elements 335 can be made of a variety of different materials. In one embodiment, partially reflective elements 335 are fabricated of a layer of conventional non-polarizing beam splitter material (e.g., thin silver layer, CrO2, etc.). The degree of reflectivity can be selected based upon the particular application (e.g., primarily indoor use, outdoor use, combination use, etc.). In one embodiment, partially reflective elements 335 comprise a 10% reflective 100 nm layer of CrO2.

In another embodiment, partially reflective elements 335 are fabricated of a multi-layer dichroic thin film structure. Dichroic films can be created to have a selectable reflectivity at a selectable wavelength. Additionally, the dichroic film can be designed to improve the angle selectivity of the reflective diffraction grating 315. A dichroic film can be designed with high reflectivity to a specific wavelength or wavelength band that overlaps with display light 130 and to the angles of incidence of display light 130, while being substantially more transparent to other visible spectrum wavelengths and to the normal incidence of external scene light 145. In this manner, the efficiency of optical combiner 301 can be improved while also increasing the brightness of the transmitted external scene light 145.

In yet another embodiment, partially reflective elements 335 are fabricated of polarizing beam splitter material that substantially reflects one linear polarization of incident light while substantially passing the orthogonal linear polarization. In this case, display unit 302 could be designed to emit polarized display light matching the reflection characteristic of partially reflective elements 335. Since ambient light typically has a random polarization, approximately 50% of external scene light 230 would pass through optical combiner 301 to eye 304.

Display unit 302 can be fabricated using a variety of compact image source technologies such as the various micro-displays used today in pico-projectors, liquid crystal on silicon ("LCOS") displays, backlit liquid crystal displays, organic light emitting diode ("OLED") displays, quantum dot array displays, light emitting diode ("LED") arrays, or otherwise. Display unit 302 can be configured to provide a single color or narrow spectral band display light. Diffractive optical combiner 301 can be fabricated of a variety of clear optically transmissive materials, including plastic (e.g., acrylic, thermo-plastics, poly-methyl-metha-crylate (PMMA), ZEONEX—E48R, glass, quartz, etc.). For example, in one embodiment, substrate 305, base sandwich layer 310, and planarization sandwich layer 320 are fabricated of plastic. In another embodiment, substrate 305 is glass while base sandwich layer 310 and planarization sandwich layer 320 are fabricated of silicon dioxide. Of course, other material combinations can be used.

Figure 5:
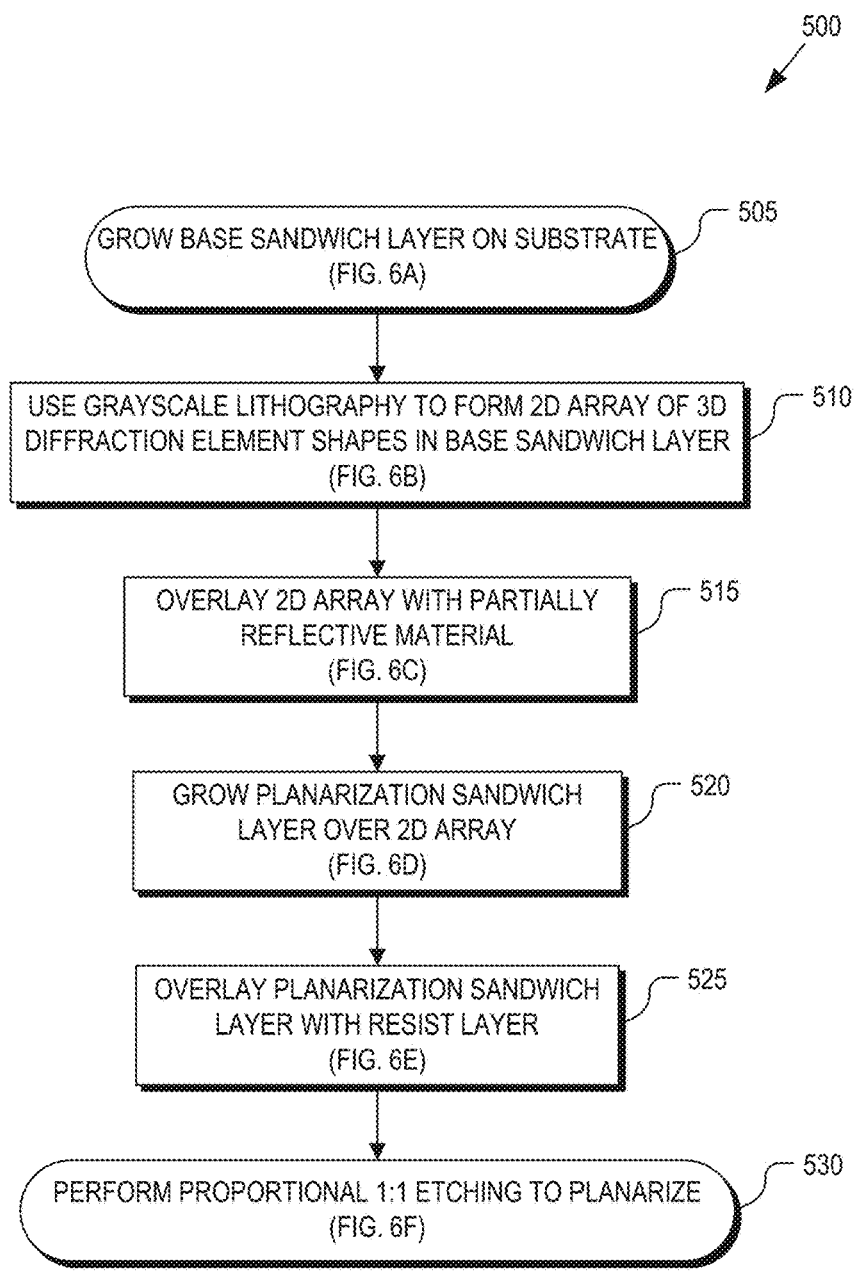
FIG. 5 is a flow chart illustrating an embodiment of a process for fabricating a sandwiched diffractive optical combiner using lithography.
Figure 6A:
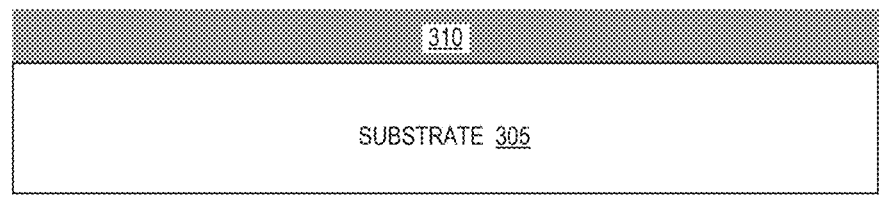
FIGS. 6A-6F are cross-sectional drawings showing an embodiment of a process for fabricating a sandwiched diffractive optical combiner using lithography.
Figure 6B:
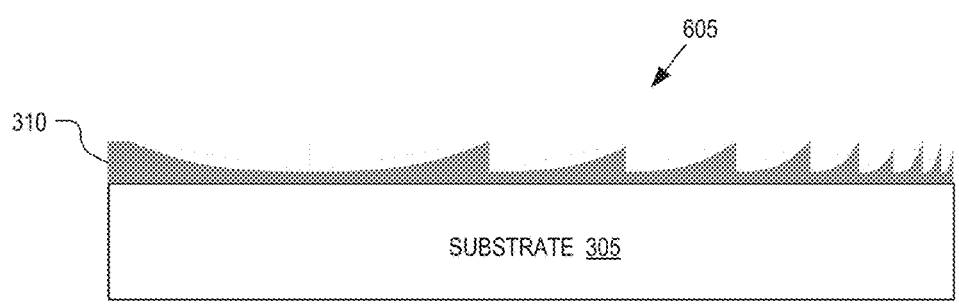
Figure 6C:
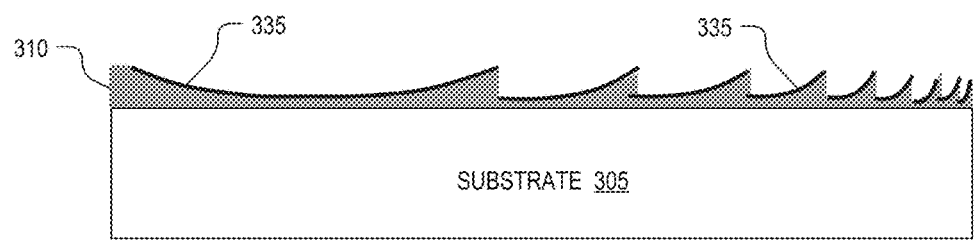
Figure 6D:
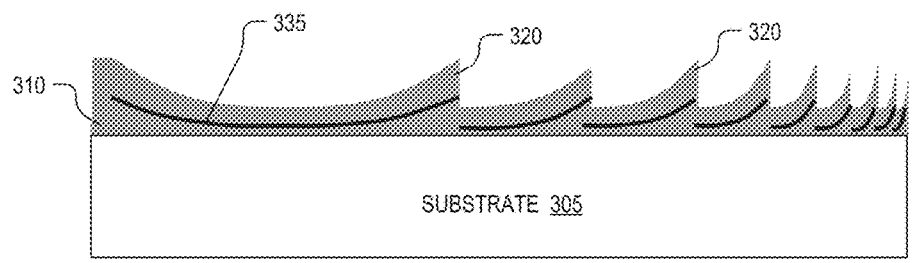
Figure 6E:
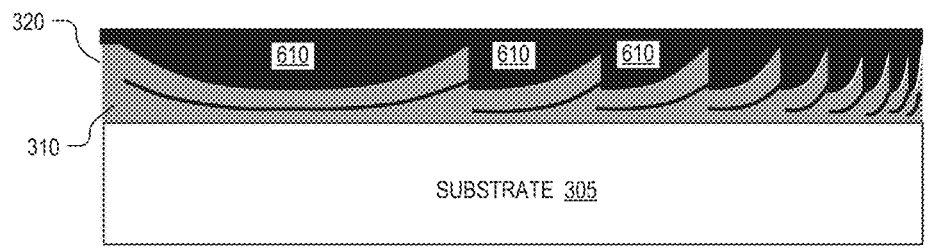
Figure 6F:
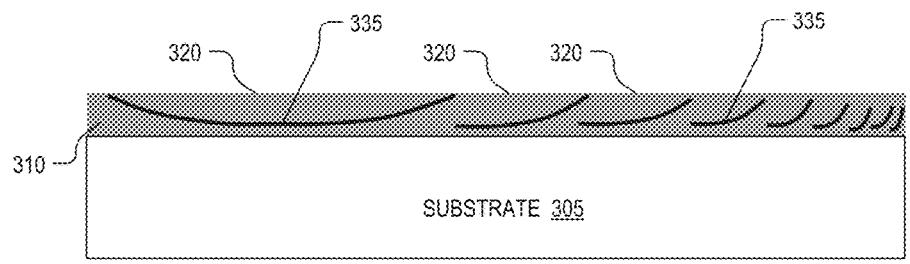

FIG. 5 illustrates an embodiment of a process 500 for fabricating sandwiched diffractive optical combiner 301 using lithography. Process 500 is described with reference to FIGS. 6A-6F and describes one technique for fabricating an embodiment of diffractive optical combiner 301 using silicon dioxide on a glass substrate. The order in which some or all of the process blocks appear in process 500 should not be deemed limiting. Rather, in other embodiments some of the process blocks can be executed in a variety of orders not illustrated, or even in parallel.

In a process block 505, base sandwich layer 310 is deposited onto substrate 305, which is fabricated of a clear material such as glass, quartz, plastic, or otherwise. In this embodiment, base sandwich layer 310 is a layer of silicon dioxide approximately 1 µm thick. In a process block 510, grayscale lithography and reactive ion etching is used to form the 2D array of 3D diffraction shapes 605 into base sandwich layer 310. In a process block 515, shapes 605 are overlaid via sputtering with a layer of partially reflective material. In one embodiment, the partially reflective material layer is approximately 10% reflective (but other reflectivity percentages can be used in other embodiments). In one embodiment, the partially reflective material layer is approximately 100 nm thick of CrO2 material. In a process block 520, planarization sandwich layer 320 is deposited onto of the partially reflective material layer. In one embodiment, planarization sandwich layer 320 is deposited to be approximately 1.5 µm thick, but at this stage planarization sandwich layer 320 is not yet planar. In a process block 525, a resist material 610 is coated over planarization sandwich layer 320. Finally, in a process block 530, resist material 610 is removed during planarization, which proceeds to a depth that results in a planar top to planarization sandwich layer 320. Such a process can be implemented as a proportional reactive ion etching (RIE) process (or CAIBE process—Chemically Assisted Ion Beam Etching) where the resist etching rate and the underlying SiO2 etching rate are exactly similar. In one embodiment, chemical-mechanical polishing is used to remove resist layer 610 and planarize planarization sandwich layer 320. In one embodiment, a proportional reactive ion etch with a 1:1 ratio that etches both resist material 610 and planarization sandwich layer 320 at the same rate is used. Other standard or custom planarization techniques can be used.

Mass production techniques can be used to fabricate various other embodiments of diffractive optical combiner 301. For example, a master combiner can be fabricated to be used as a mold for plastic replication via injection molding or hot/UV embossing. Base sandwich layer 310 can be fabricated of thermo-plastic material that is injection molded. Partially reflective elements 335 can be overlaid or coated onto the 2D array of 3D diffraction shapes and planarization sandwich layer 320 laminated over the partially reflective material. Diamond turning with CNC machine-tools can be used in place of lithography to shape the various curved fringes making up the optical combiner. In other embodiments, base sandwich layer 310 can be fabricated using press molding into thermo-plastic or plastic embossing using a roller drum having a negative impression of the 2D array of 3D diffraction shapes disposed thereon.

Figure 7:
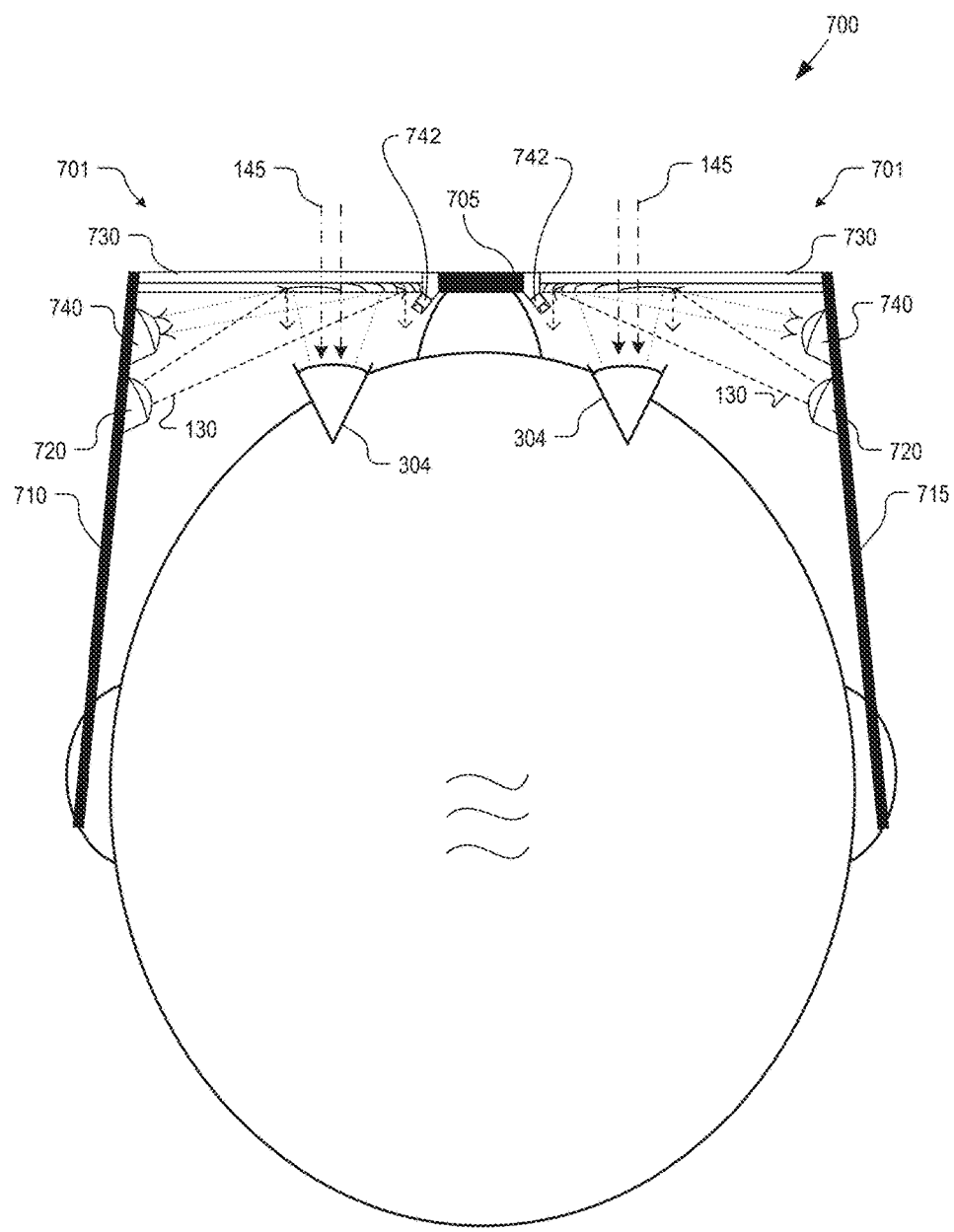
FIG. 7 is a top view of an embodiment of a binocular head-mounted display using two see-through displays that each include a diffractive optical combiner.

FIG. 7 is a top view of a binocular HMD 700 using a pair of see-through displays 701. Each see-through display 701 can be implemented with embodiments of optical assemblies 100 or 150, and/or see-through display 300. See-through displays 701 are mounted to a frame assembly, which includes a nose bridge 705, left ear arm 710, and right ear arm 715. Although FIG. 7 illustrates a binocular embodiment, HMD 700 can also be implemented as a monocular HMD.

See-through displays 701 are secured into an eyeglass arrangement that can be worn on the head of a user. The left and right ear arms 710 and 715 rest over the user's ears while nose assembly 705 rests over the user's nose. The frame assembly is shaped and sized to position each diffractive optical combiner in front of a corresponding eye 304 of the user. Of course, other frame assemblies having other shapes can be used (e.g., a visor with ear arms and a nose bridge support, a single contiguous headset member, a headband, goggles type eyewear, etc.).

The illustrated embodiment of HMD 700 is capable of displaying an augmented reality to the user. Each see-through display 701 permits the user to see a real world image via external scene light 145. Left and right (in a binocular embodiment) display light 130 can be generated by display units 720 mounted to left and right ear arms 710. Similarly, left and right eyes 304 can be tracked using eye-tracking sensors 740 mounted on left and right ear arms 710 and 715, together with eye-tracking radiation sources 742 positioned adjacent to the diffractive combiners. Display light 130 can be pre-compensated by optics coupled to the display units to correct for optical aberrations introduced by the diffractive optical combiner upon reflection into eyes 304. Display light 130 is seen by the user as a virtual image superimposed over external scene light 145 as an augmented reality. In some embodiments, external scene light 145 can be partially blocked or selectively blocked to provide sun shading characteristics and increase the contrast of display light 130.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
a diffractive combiner having a front side, a back side, and a combiner optical axis running substantially through the diffractive combiner and normal to the back side;
a display unit having a display optical axis, wherein the display unit is positioned to direct display light along the display optical axis toward the diffractive combiner; and
an eye-tracking sensor having a sensor optical axis, wherein the eye-tracking sensor is positioned to receive eye-tracking radiation reflected by the diffractive combiner along the sensor optical axis;
wherein the combiner optical axis, the display optical axis, and the sensor optical axis intersect each other at the diffractive combiner.

2. The apparatus of claim 1 wherein the display light has a first range of wavelengths, and wherein the eye-tracking radiation has a second wavelength outside the first range of wavelengths.

3. The apparatus of claim 1 wherein the display unit is positioned at a first distance from the diffractive combiner and the eye-tracking sensor is positioned at a second distance from the diffractive combiner, the first distance being different than the second distance.

4. The apparatus of claim 1 wherein the display light has a first wavelength range within a visible range of a spectrum, wherein the eye-tracking radiation has a second wavelength in an infra-red part of the spectrum.

5. The apparatus of claim 4 wherein the second wavelength is an integral multiple of a center wavelength of the first wavelength range.

6. The apparatus of claim 1, further comprising optics coupled to at least one of the display unit or the eye-tracking sensor, wherein the optics are positioned between the diffractive combiner and at least one of the display unit or the eye-tracking sensor, and wherein the optics pre-compensate for at least a portion of optical aberrations due to the diffractive combiner.

7. The apparatus of claim 1 wherein the diffractive combiner comprises a reflective diffraction grating that is at least partially reflective to the display light incident on the back side of the diffractive combiner and at least partially transmissive to external scene light incident on the front side of the diffractive combiner.

8. The apparatus of claim 7 wherein the front side and the back side of the diffractive combiner are flat, planar surfaces that are parallel to each other.

9. The apparatus of claim 7, wherein the diffractive combiner further comprises:
a base sandwich layer having a first index of refraction and including a first side facing the back side;
a two-dimensional ("2D") array of three-dimensional ("3D") diffraction element shapes disposed in the first side of the base sandwich layer;
partially reflective elements each coating one of the 3D diffraction element shapes and conforming thereto, wherein the partially reflective elements collectively form the reflective diffraction grating having magnifying optical power for the display light incident through the back side of the diffractive combiner; and
a planarization sandwich layer disposed over the partially reflective elements having a second index of refraction substantially equal to the first index of refraction of the base sandwich layer such that external scene light incident through the front side passes through the diffractive combiner substantially without diffraction while the display light incident on the back side is reflected and magnified via the reflective diffraction grating.

10. The apparatus of claim 9 wherein the reflective diffraction grating comprises an off-axis diffractive lens that receives the display light incident upon the back side at a first angle and reflects the display light along a reflection path having a second angle, wherein the first angle is more oblique relative to a normal of an emission surface of the planarization sandwich layer than the second angle.

11. The apparatus of claim 1, further including a fold element positioned to redirect the sensor optical axis, wherein the fold element receives and reflects the eye-tracking radiation from the diffractive combiner to the eye-tracking sensor.

12. The apparatus of claim 1, further comprising a source of the eye-tracking radiation positioned to direct the eye-tracking radiation to be reflected from an eye toward the back side of the diffractive combiner.

13. A system comprising:
    a frame assembly for wearing on a head of a user, the frame assembly designed to support one or more see-through displays, each see-through display comprising:
        a diffractive combiner having a front side, a back side, and a combiner optical axis running substantially through the diffractive combiner and normal to the back side;
        a display unit having a display optical axis, wherein the display unit is positioned to direct display light along the display optical axis toward the diffractive combiner; and
        an eye-tracking sensor having a sensor optical axis, wherein the eye-tracking sensor is positioned to receive eye-tracking radiation reflected by the diffractive combiner along the sensor optical axis,
        wherein the combiner optical axis, the display optical axis, and the sensor optical axis intersect each other at the diffractive combiner.

14. The system of claim 13 wherein the display light has a first range of wavelengths, and wherein the eye-tracking radiation has a second wavelength outside of the first range of wavelengths.

15. The system of claim 13 wherein the display light is positioned at a first distance from the diffractive combiner and the eye-tracking sensor is positioned at a second distance from the diffractive combiner, the first distance being different than the second distance.

16. The system of claim 15 wherein the first distance is greater than the second distance.

17. The system of claim 13 wherein the display light has a first wavelength range within a visible range of a spectrum, wherein the eye-tracking radiation has a second wavelength in an infra-red part of the spectrum.

18. The system of claim 17 wherein the second wavelength is an integral multiple of a center wavelength of the first wavelength range.

19. The system of claim 13 wherein the diffractive combiner comprises a reflective diffraction grating that is at least partially reflective to the display light incident on the back side of the diffractive combiner and at least partially transmissive to external scene light incident on the front side of the diffractive combiner.

20. The system of claim 13 wherein the front side and the back side of the diffractive combiner are flat, planar surfaces that are parallel to each other.

* * * * *